US011194994B2

(12) United States Patent
Mair et al.

(10) Patent No.: US 11,194,994 B2
(45) Date of Patent: Dec. 7, 2021

(54) SEMANTIC ZONE SEPARATION FOR MAP GENERATION

(71) Applicant: X Development LLC, Mountain View, CA (US)

(72) Inventors: Elmar Mair, Santa Cruz, CA (US); Jonas Witt, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 145 days.

(21) Appl. No.: 15/848,561

(22) Filed: Dec. 20, 2017

(65) Prior Publication Data

US 2019/0188477 A1 Jun. 20, 2019

(51) Int. Cl.
*G06K 9/00* (2006.01)
*G01C 21/20* (2006.01)
*G06T 7/70* (2017.01)

(52) U.S. Cl.
CPC ....... *G06K 9/00201* (2013.01); *G01C 21/206* (2013.01); *G06K 9/00664* (2013.01); *G06T 7/70* (2017.01); *G06T 2207/10044* (2013.01)

(58) Field of Classification Search
CPC .......... G06K 9/00201; G06K 9/00664; G01C 21/206; G06T 7/70; G06T 2207/10044
See application file for complete search history.

(56) References Cited

U.S. PATENT DOCUMENTS

| 8,214,079 | B2 | 7/2012 | Lee et al. |
| 8,396,254 | B1 | 3/2013 | Hickman |
| 8,432,443 | B2 | 4/2013 | Nam et al. |
| 9,129,148 | B1 | 9/2015 | Li et al. |
| 9,574,883 | B2 | 2/2017 | Watts et al. |
| 9,751,212 | B1 | 9/2017 | Martinson et al. |
| 2003/0214502 | A1* | 11/2003 | Park ....................... G06T 15/205 345/420 |
| 2011/0187704 | A1* | 8/2011 | Chen ....................... G06T 15/00 345/419 |
| 2013/0147911 | A1* | 6/2013 | Karsch ................. H04N 13/261 348/43 |

(Continued)

OTHER PUBLICATIONS

Albrecht et al., "Model-based furniture recognition for building semantic object maps," Artificial Intelligence, Jan. 2015.*

(Continued)

*Primary Examiner* — Michael J Hess
(74) *Attorney, Agent, or Firm* — Fish & Richardson P.C.

(57) ABSTRACT

Methods, systems, and apparatus for receiving a mapping of a property that includes a three-dimensional representation of the property, receiving observations of the property that each depict a portion of the property, providing the mapping and the observations to an object mapping engine, receiving an object mapping of the property, wherein the object mapping includes a plurality of object labels that each identify an object that was recognized from the observations and a location of the object within the three-dimensional representation that corresponds to a physical location of the object in the property, and obtaining a semantic mapping of the property that identifies semantic zones of the property with respect to the three-dimensional representation, wherein the semantic mapping is generated based on an output that results from a semantic mapping model processing the object mapping.

20 Claims, 4 Drawing Sheets

(56) References Cited

U.S. PATENT DOCUMENTS

| | | | |
|---|---|---|---|
| 2015/0268058 A1* | 9/2015 | Samarasekera | G06K 9/00637 |
| | | | 701/409 |
| 2017/0249504 A1 | 8/2017 | Martinson et al. | |
| 2018/0120424 A1* | 5/2018 | Eshel | G01S 7/497 |
| 2018/0200884 A1* | 7/2018 | Perets | B25J 9/163 |
| 2019/0129444 A1* | 5/2019 | Wirth | G05D 1/0274 |

OTHER PUBLICATIONS

Blodow, et al., "Autonomous Semantic Mapping for Robots Performing Everyday Manipulation Tasks in Kitchen Environments," Intelligent Robots and Systems, Sep. 2011.*
Mozos et al., "Supervised semantic labeling of places using information extracted from sensor data," Robotics and Autonomous Systems, 2007.*
Rusu et al., "Model-based and Learned Semantic Object Labeling in 3D Point Cloud Maps of Kitchen Environments," Intelligent Robots and Systems, 2009.*
Surmann et al., "An autonomous mobile robot with a 3D laser range finder for 3D exploration and digitalization of indoor environments," Robotics and Autonomous Systems, 2003.*
Gunther et al., "Buiding Semantic Object Maps from Sparse and Noisy 3D Data," Intelligent Robots and Systems, 2013.*
Lai et al., "Detection-based Object Labeling in 3D Scenes," IEEE International Conference on Robotics and Automation, 2012.*
Wurm et al., "OctoMap: A Probabilistic, Flexible, and Compact 3D Map Representation for Robotic Systems".*
Nuchter et al., "Towards semantic maps for mobile robots," Robotics and Autononmous Systems, 2008.*
PCT International Search Report in International Application No. PCT/US2018/065475, dated Apr. 19, 2019, 16 pages.
'stanford.edu' [online] "PointNet: Deep learning on point sets for 3D classification and segmentation" Qi et al., Stanford University Presentation, 2017, [retrieved on Dec. 19, 2017] Retrieved from Internet: URL<http://stanford.edu/~rqi/pointnet/docs/cvpr17_pointnet_slides.pdf> 68 slides.
'www.qualcomm.com' [online] "Finding Objects in Cluttered Scenes for Home Robotics," Jim Little, Presentation in Laboratory for Computational Intelligence Computer Science, UBC Vancouver, [retrieved on Dec. 19, 2017] Retrieved from Internet: URL<https://www.qualcomm.com/media/.../augmented-reality-lecture-series-jim-little.pdf> 91 slides.
Althaus et al. "Behavior coordination in structured environments," Advanced Robotics, vol. 17 (7), Jan. 1, 2003, 19 pages.
Anati, "Semantic Localization and Mapping in Robot Vision," University of Pennsylvania, Scholarly Commons, Publicly Accessible Penn Dissertations, 1587, Jan. 1, 2016, 172 pages.
Buschka et al. "A Virtual Sensor for Room Detection," IEEE/RSJ International Conference on Intelligent Robots and Systems, vol. 1, 2002, 6 pages.
Choi et al. "Automated Space Classification for Network Robots in Ubiquitous Environments," Journal of Sensors, vol. 2015, Article ID 954920, 2015, 9 pages.
Espinace et al. "Indoor scene recognition by a mobile robot through adaptive object detection," Robotics and Autonomous Systems vol. 61(9), Sep. 30, 2013, 16 pages.
Garcia-Garcia et al. "A review on deep learning techniques applied to semantic segmentation," arXiv 1704.06857v1, Apr. 22, 2017, 23 pages.
Guo et al. "3D mesh labeling via deep convolutional neural networks," ACM Transactions on Graphics, vol. 35(1) Dec. 29, 2015, 12 pages.
Koenig et al. "Xavier: A robot navigation architecture based on partially observable markov decision process models," Artificial Intelligence Based Mobile Robotics: Case Studies of Successful Robot Systems, May 1, 1998, 24 pages.
Kuipers et al. "Bootstrap Learning for Place Recognition," In Proceedings of the 18th National Conference on Artificial Intelligence, Jul. 2002, 7 pages.
Maturama et al. "VoxNet: a 3D convolutional neural network for real-time object recognition" IEEE/RSJ International Conference on Intelligent Robots and Systems, Sep. 28, 2015, 7 pages.
McCormac et al. "SemanticFusion: Dense 3D Semantic Mapping with Convolutional Neural Networks," arXiv 1609.05130, Sep. 16, 2016, 8 pages.
Mozos, "Semantic Labeling of Places with Mobile Robots," vol. 61, Heidelberg: Springer, Feb. 4, 2010, 176 pages.
Paszke, et al. "ENet: a deep neural network architecture for real-time semantic segmentation," Under review as a conference paper at ICLR, arXiv preprint arXiv 1606.02147, Jun. 2017, 10 pages.
Pronobis et al. "A realistic benchmark for visual indoor place recognition," Robitcs and Autonomous Systems vol. 58(1), Jan. 31, 2010, 17 pages.
Pronobis et al. "Multi-modal Semantic Place Classification," The International Journal of Robotics Research vol. 29(2-3) Feb. 2010, 24 pages.
Qi et al. "PointNet: Deep learning on point sets for 3D classification and segmentation" Conference on Computer Vision and Pattern Recognition, 2017, 4 pages.
Ribes et al. "Object-based Place Recognition for Mobile Robots Using Panoramas," Proceedings of the 11th International Conference of the Catalan Association for Artificial Intelligence, Bol. 184, Oct. 15, 2008, 8 pages.
Rottmann et al. "Semantic Place Classification of Indoor Environments with Mobile Robots using Boosting," AAAI vol. 5, Jul. 9, 2005, 6 pages.
Rusu et al. "Model-based and learned semantic object labeling in 3d point cloud maps of kitchen environments," IEEE/RSJ International Conference on Intelligent Robots and Systems, Oct. 10, 2009, 8 pages.
Torralba et al. "Context-based Vision system for place and object recognition," IEEE, Null., Oct. 13, 2003, 8 pages.
Vasudevan et al. "Cognitive Maps for Mobile Robots," Robotics and Autonomous Systems, 55, Jan. 2007, 13 pages.
Wang et al. "Scene classification with deep convolutional neural networks," Semantic Scholar, [retrieved on Dec. 19, 2017] Retrieved from Internet: URL< https://yzhwang.github.io/ecs289h-vision.pdf > 7 pages.
Yu et al. "CASENet: deep category-aware semantic edge detection," arXiv 1705.09759v1, May 27, 2017, 16 pages.
PCT International Preliminary Report on Patentability in International Application No. PCTUS2018/065475, dated Jun. 23, 2020, 10 pages.

* cited by examiner

SEMANTIC ZONE SEPARATION FOR MAP GENERATION

TECHNICAL FIELD

This application relates generally to generating three-dimensional (3D) mappings of properties.

BACKGROUND 3D mappings such as polygonal meshes, point clouds, or point splatting representations can be used to represent spaces, including outdoor spaces or the interior of buildings. 3D mappings can be generated using a variety of methods, such as stereo imaging, light detection and ranging (LIDAR), sonar, radar, or other forms of imaging or depth sensing.

3D mappings can capture not only the structure of interior spaces, such as the walls of a building, but also the structure of objects that are present in the space. Object identification can be performed using a number of techniques to identify objects that may also be represented in these 3D mappings. For example, object recognition can utilize images, and can identify specific objects in the images based on determining that certain geometric shapes corresponding to those objects are present in the images. Other forms of object recognition can identify objects based on 3D mappings of the objects.

Processing images or 3D mappings to perform object recognition can be accomplished in a variety of ways. One such method is using a neural network. Neural networks are machine learning models that employ one or more layers to create an output, e.g., a classification, for a received input. Some neural networks include one or more hidden layers in addition to an output layer. The output of each hidden layer is provided as an input to a next layer in the neural network, i.e., a next hidden layer or an output layer of the neural network. Each layer of the neural network generates an output from a received input in accordance with current values of a respective set of parameters. Neural networks can undergo training to increase the accuracy of the neural network outputs.

SUMMARY

This specification relates to generating 3D mappings of properties, and one particular implementation relates to generating semantic mappings of properties in which distinct portions of 3D mappings of properties are identified as distinct semantic zones. More particularly, this specification describes a system configured to generate a 3D mapping of a property in which different spaces of the mapping, corresponding to different spaces of the property such as rooms or other areas, are assigned a semantic type indicating a primary purpose of those spaces. Semantic zones can indicate, for example, primary purposes of the different spaces within the property, by designating the spaces as kitchens, bedrooms, bathrooms, dining rooms, sitting rooms, and the like. As used in this specification, a property may be any space capable of being mapped or of being represented by a semantic mapping, such as a space having multiple semantically distinct regions (e.g., an office, warehouse, factory, or residence having multiple rooms). While the present disclosure focuses on determining semantic zones within buildings or similar indoor properties, similar techniques can be utilized to define semantic zones outside of buildings, such as in parks, on farms, in cities, or in any number of other properties.

To assign semantic zones to a 3D mapping of a property, the system generates or receives a 3D mapping of the property. The system also receives other data from the property, such as a series of images from the interior of the property or a series of LIDAR or other range sensing measurements taken from the property. Using the images or range sensing measurements, the system identifies objects in the property. The system then maps those objects to the 3D mapping of the property by labelling the appropriate portions of the 3D mapping as the identified objects and other portions of the 3D mapping as free space, to generate an object mapping of the property.

The system uses the object mapping of the property to generate a semantic mapping of the property that defines semantic zones of the property. To do so, the object mapping of the property is provided as an input to a semantic mapping engine of the system that then generates a 3D mapping of the property in which different spaces of the 3D mapping are labelled as semantic zones having specific semantic zone types. The semantic mapping engine may include, for example, a semantic mapping model that receives the object mapping of the property and outputs a semantic mapping of the property. While the primary example discussed herein describes the semantic mapping model as a semantic mapping neural network, in other examples different semantic models may be used.

Innovative aspects of the subject matter described in this specification may be embodied in methods, systems, and computer-readable devices storing instructions configured to perform the actions of receiving data that specifies a mapping of a property, wherein the mapping of the property includes a three-dimensional representation of the property that was generated based on measurements taken at the property, receiving one or more observations of the property, wherein each of the one or more observations depicts at least a portion of the property that is represented in the mapping of the property, providing the data that specifies the mapping of the property and the one or more observations of the property to an object mapping engine, receiving, from the object mapping engine, an object mapping of the property, wherein the object mapping of the property includes a plurality of object labels that each identify a respective object that was recognized from at least one of the one or more observations of the property, and a location of the respective object within the three-dimensional representation of the property that corresponds to a physical location of the particular object in the property, and obtaining a semantic mapping of the property that defines one or more semantic zones of the property with respect to the three-dimensional representation of the property, wherein the semantic mapping is generated based on an output that results from a semantic mapping model processing the object mapping of the property.

These and other embodiments may each optionally include one or more of the following features. In various examples, the three-dimensional representation of the property is a three-dimensional mesh representation of the property, a point cloud representation of the property, or a point splatting representation of the property; each of the one or more observations of the property is associated with a location at the property and a perspective from which the image was obtained.

Embodiments may also each optionally include one or more of the following features. In various examples, receiving the object mapping of the property comprises receiving a plurality of range detection measurements obtained from the property, providing the plurality of range detection measurements obtained from the property to the object mapping engine, and receiving, from the object mapping engine, the object mapping of the property, wherein the object mapping of the property includes a plurality of object labels that each identify a respective object that was recognized based at least on the plurality of range detection measurements obtained from the property, and a location of the respective object within the three-dimensional representation of three-dimensional representation of the property that corresponds to a physical location of the respective object in the property; the object mapping engine is configured to perform geometry-based object classification using the one or more observations of the property.

Embodiments may also each optionally include one or more of the following features. In various examples, the object mapping of the property is a labelled three-dimensional mesh representation of the property, and wherein each cell of the labelled three-dimensional mesh representation of the property is labelled as an object that was recognized from at least one of the one or more observations of the property, or as free space; each object label of the plurality of object labels is associated with a respective plurality of the cells of the labelled three-dimensional mesh representation of the property that correspond to a respective object that was recognized from at least one of the one or more observations of the property; wherein the semantic mapping model is configured to identify a set of related object labels from among the plurality of object labels, wherein each of the set of related object labels identifies an object of a set of related objects that were recognized from the one or more observations of the property, identify a set of cells of the cells of the labelled three-dimensional mesh representation of the property, the set of cells comprising the pluralities of cells associated with each of the related object labels, determine a cube of interest that includes the set of cells of the cells of the labelled three-dimensional mesh representation of the property, and define, as a semantic zone of the one or more semantic zones of the property, the cube of interest that includes the set of cells of the labelled three-dimensional mesh representation of the property.

Embodiments may also each optionally include one or more of the following features. In various examples, the features include performing the actions of providing a synthetic object mapping of a synthetic property to the semantic mapping model, obtaining an estimated semantic mapping of the synthetic property that defines one or more semantic zones of the synthetic property, wherein the estimated semantic mapping is generated based on an output that results from the semantic mapping model processing the synthetic object mapping of the synthetic property, providing the estimated semantic mapping and a synthetic semantic mapping of the synthetic property corresponding to the synthetic object mapping of the synthetic property to an error computation engine, obtaining, from the error computation engine, an error that is determined based at least on deviations between the estimated semantic mapping and the synthetic semantic mapping of the synthetic property, and training the semantic mapping model based at least on the error.

Embodiments may also each optionally include one or more of the following features. In various examples, each semantic zone of the one or more semantic zones does not overlap another semantic zone of the one or more semantic zones; each semantic zone of the one or more semantic zones corresponds to an area in the property that is identified as dedicated to a particular purpose; the features include performing the actions of transmitting the semantic mapping of the property to one or more autonomous robots; the measurements taken at the property and the one or more observations of the property are received from one or more autonomous robots; the one or more observations of the property comprise one or more images of the property that each depict at least a portion of the property or one or more point clouds that each depict at least a portion of the property that is represented in the mapping of the property.

Some implementations of the subject matter described herein can, in certain instances, realize one or more of the following advantages. The semantic mapping of the property can improve the performance of other systems by providing context of the semantic zones within the property. For example, the semantic mapping can be provided to an autonomous robot for use by the autonomous robot when navigating the property, responding to commands while located in the property, or performing actions within the property. The semantic mapping of the property can provide context that the autonomous robot can utilize to more accurately respond to situations, and to allow for more natural interactions with humans in the property. In some implementations, the semantic mapping of the property can be used to resolve objects that are located within the property.

As an example, using the context of the semantic zones within a home, an autonomous robot that is instructed "bring my cup from the kitchen" can recognize which area of the property to search for a cup (i.e., the kitchen), rather than searching for a cup in other spaces of the home. In another example, the context of a semantic zone can improve the ability of an autonomous robot to interpret user speech and to respond to user speech. For example, an autonomous robot may perform different actions in response to the command "move the flower" if the robot is located in a living room than if they are located in a kitchen, i.e., where the robot may interpret the phrase to include the word "flower" when located in a semantic zone identified as a living room, but to include the word "flour" when located in semantic zone identified as a kitchen. In a third example, an object mapping of the property that labels portions of the property as corresponding to particular objects can be updated or improved using the semantic mapping. For example, an object that was previously labelled as a dishwasher may be re-labelled as a television based on the semantic mapping indicating that the object is located in a bedroom semantic zone of the property.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
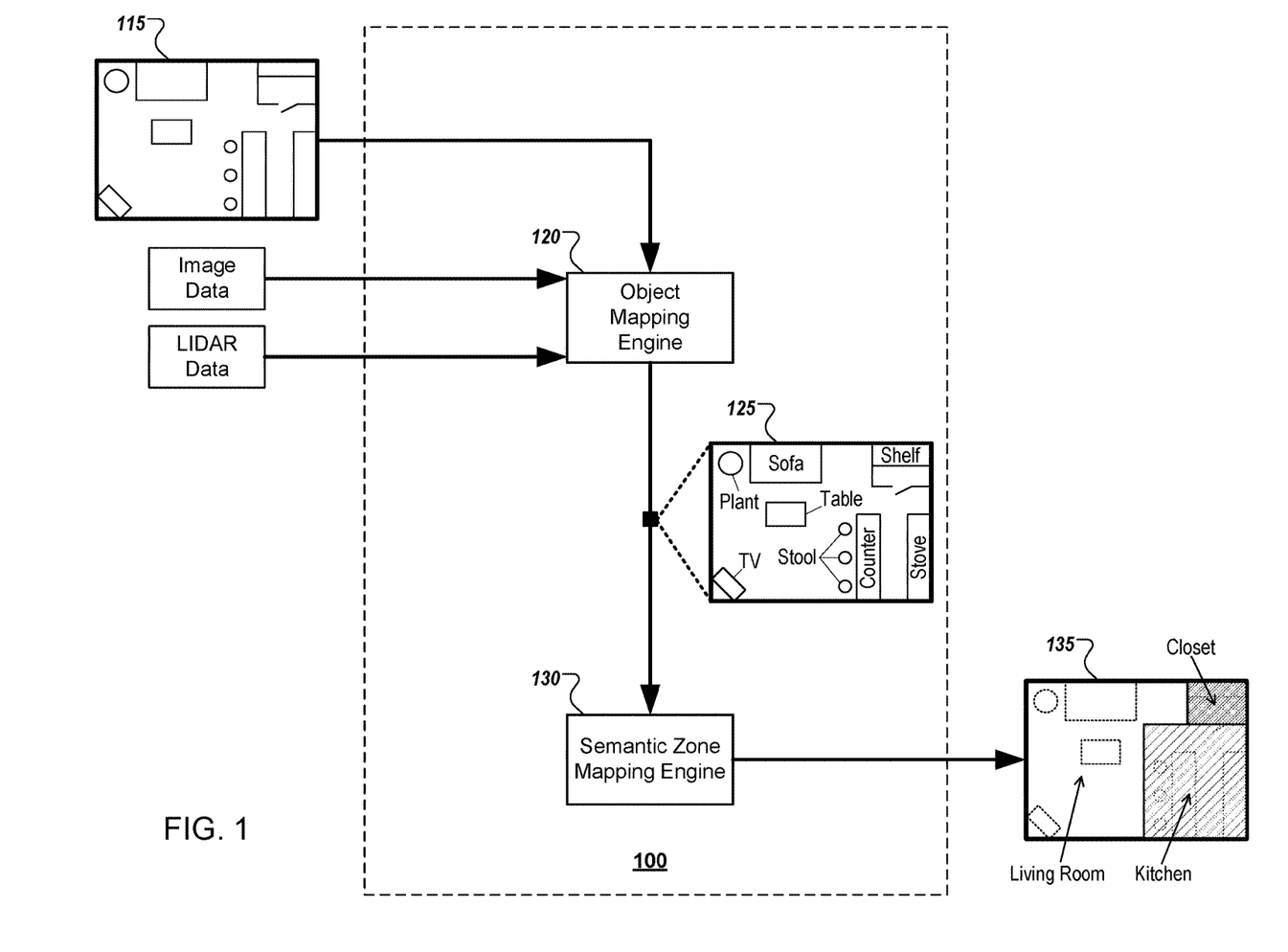
FIGS. 1 and 2 depict example systems configured to generate a semantic mapping of a property based on a 3D mapping of a property and other input data.

FIG. 1 depicts an example system 100 for generating a semantic mapping of a property. As shown in FIG. 1, the system 100 includes an object mapping engine 120 and a semantic zone mapping engine 130. To generate a semantic mapping of a property, data that specifies a mapping 115 of the property is submitted to the system 100, along with image data and LIDAR data collected from the property.

The mapping 115 is a 3D representation of the property that was generated based on measurements taken at the property. For example, the mapping 115 may be a polygonal mesh representation of the property, a point cloud representation of the property, a point splatting representation of the property, or any other type of 3D mapping that represents the property. The mapping 115 may be generated based on measurements taken at the property. For example, a series of range measurements may be obtained using LIDAR, radar, sonar, stereo imaging, or other techniques, along with a location and orientation of the range sensor when taking each of the range measurements. Based on the range measurements and the position and orientation of the range sensor for each of the measurements, a 3D mapping of the property can be obtained and used as the mapping 115 of the property provided to the system 100.

In some implementations, the series of range measurements may be obtained by an autonomous robot that is equipped with a range sensor, e.g., a stereo camera or LIDAR sensor, and the location and orientation of the autonomous robot may be recorded for each of the series of range measurements. The autonomous robot or another system may process the series of range measurements to obtain the mapping 115 of the property. In other implementations, a plurality of autonomous robots may be used to obtain the range measurements.

As shown in FIG. 1, in addition to the mapping 115 of the property, the system 100 also receives data corresponding to observations of the property, including image data corresponding to images obtained from the property and LIDAR data corresponding to LIDAR measurements obtained from the property. The images may depict all or portions of the property, and may each be associated with a location and perspective from which the image was obtained. Similarly, LIDAR measurements describing all or portions of a property may be obtained from the property, and may each be associated with a location and orientation of the LIDAR sensor when the measurement was obtained. In some implementations, the image data and LIDAR data may be obtained by one or more autonomous robots, or may be otherwise obtained. While, as shown in FIG. 1, the system 100 receives image data corresponding to images obtained from the property, in other implementations, the system 100 may receive data corresponding to point clouds or other observations, e.g., 3D renderings, generated based on data obtained from the property.

While, in FIG. 1, both LIDAR and images are provided to the system 100, in other implementations, only one of image data or LIDAR data is provided to the system 100. Other data may also be provided to the system 100 in addition to or in place of the LIDAR data or image data, such as sonar data, radar data, stereo camera images, video, infrared images or video, or other data depicting the property.

The object mapping engine 120 receives the mapping 115 of the property, the image data, and the LIDAR data. Based on the received information, the object mapping engine 120 generates an object mapping 125 of the property. The object mapping 125 of the property is similar to the mapping 115 of the property, except that the object mapping 125 includes a plurality of object labels. The object labels each identify a portion of the mapping 115 as corresponding to a particular object, as well as a location of the particular object within the mapping 115 of the property. The object labels are determined based on identifying objects using the image data, the LIDAR data, or a combination of both, received by the object mapping engine 120.

For example, the object mapping engine 120 can receive the image data and LIDAR data, e.g., from one or more autonomous robots that are capturing images and LIDAR measurements within the property. The object mapping engine 120 may include an object recognition engine that is capable of identifying objects from image data or LIDAR data. The object recognition engine of the object mapping engine 120 can process the image data, LIDAR data, or a combination of the image data and LIDAR data to identify objects depicted by the data. Having identified the objects depicted by the data, the object mapping engine 120 can utilize the location and orientation from which the images and LIDAR measurements were taken to determine the location of the identified objects within the property. Based on these determinations, the object mapping engine 120 can match features of the mapping 115 of the property to the detected objects, and can label those features of the mapping 115 as corresponding to specific identified objects. The object mapping engine 120 can also assign locations to each of the labels, such that each label in the object mapping 125 of the property identifies an object as well as a physical location of the object within the property.

For example, an autonomous robot within the property may capture an image of the property from a particular location and orientation within the property, and may transmit the image to the system 100 where it is received by the object mapping engine 120. The object mapping engine 120 may process the image, for instance, at an object recognition engine. Based on processing the image, the object mapping engine 120 may determine that the image depicts a table and three stools. Using the location and orientation associated with the image obtained by the autonomous robot, the object mapping engine 120 can identify objects in the mapping 115 of the property that likely correspond to the table and three stools identified in the image obtained from the autonomous robot. The object mapping engine 120 may therefore create an object mapping 125 of the property, in which the mapping 115 is labeled to identify the table and the three stools, as well as their locations within the property.

The object mapping engine 125 may repeat this process for each of multiple images obtained by one or more autonomous robots within the property. As a result, an object mapping 125 of the property may be obtained in which the entire mapping 115 has been labelled as objects that have been identified by an object recognition engine of the object mapping engine 120, or as free space within the property. Portions of the property that have not been identified as objects or as free space may be otherwise labelled, for examples, as walls within the property.

Having obtained the object mapping 125 in which all of the objects within the mapping 115 of the property have been labelled as being a particular object, the object mapping engine 120 can provide the object mapping 125 of the property to the semantic mapping engine 130. The semantic zone mapping engine 130 can receive the object mapping 125 of the property, and can process the object mapping 125 to generate a semantic mapping 135 of the property.

To process the object mapping 125, the semantic zone mapping engine 130 can include a semantic mapping neural network that receives the object mapping 125 of the property, and outputs a semantic mapping 135 of the property that defines one or more semantic zones of the property. Each semantic zone may correspond to a particular area of the property that is dedicated to a predominant purpose. For example, semantic zones may include regions of a property identified as a kitchen, living room, closet, bedroom, bathroom, garage, shed, hallway, workshop, pantry, foyer, dining room, laundry room, or any other type of zone that is dedicated to a particular primary purpose.

To identify the semantic zones of the property, the semantic mapping neural network processes the object mapping 125 to identify groups of likely related objects within the property. For example, the semantic mapping neural network may process the object mapping 125 of the property and determine that the objects identified as a stove, counter, and three stools are likely related. The semantic mapping neural network may also determine that objects identified as a television, table, sofa, and plant likely form a group of related objects. Lastly, the semantic mapping neural network may determine that a shelf identified in the object mapping 125 of the property is not associated with any other objects within the property. In addition to identifying groups of objects, the semantic mapping neural network may also consider barriers, such as walls, within the property. Thus, the semantic mapping neural network may determine that the shelf is not associated with any other objects within the property, based on the shelf being isolated from the other objects within the property by having walls or a door on all sides.

Having identified groups of related objects within the property, the semantic mapping neural network can determine cubes of interest in the 3D representation of the property, where each cube of interest can be identified as a particular semantic zone. Generally, a cube of interest can represent any 3D portion of a property that includes most or all of the objects of interest in a particular group. For instance, the semantic mapping neural network of the semantic zone mapping engine 130 may identify a 3D region of the object mapping 125 of the property that includes the objects identified as a stove, a counter, and three stools. A second cube of interest including the shelf may be identified as a second semantic zone, and a third cube of interest including the television, table, sofa, and plant may be identified as a third semantic zone within the property. Each of the cubes of interest need not be geometric cubes, but rather, may have any 3D shape that captures most or all of the objects in a group of related objects.

Each of the three identified semantic zones may be labeled as a particular semantic zone type, based on the set of related objects included in each semantic zone. For example, the first semantic zone including a stove and counter may be identified as having a kitchen semantic zone type, since those objects are typically found in kitchens, while the third semantic zone including the television and sofa may be identified as having a living room semantic zone type, as those objects are commonly found in living rooms. The semantic zone mapping engine 130 may also assign locations to each of the semantic zones. For example, each semantic zone may be associated with information that specifies its dimensions, coordinates, boundaries, or other information indicating the location of the semantic zone within the property.

The semantic zone mapping engine 130 can output the semantic mapping 135 of the property. For example, the semantic mapping 135 may be provided to one or more autonomous robots to assist the autonomous robots in performing tasks at the property.

In some implementations, an autonomous robot may use the semantic mapping 135 to assist in performing object location within the property. For instance, in response to the command "bring my cup from the kitchen," an autonomous robot using the semantic mapping 135 of the property would know to look for objects that resemble cups in the semantic zone of the property that is labelled as a kitchen, rather than in the semantic zones of the property labelled as a closet or a living room. Thus, use of the semantic mapping 135 can enable the autonomous robot to more quickly locate the object, by avoiding a search in areas of the property that are not included in the semantic zone labeled as a kitchen, and can also increase the accuracy of the autonomous robot's actions, by locating only cups within the semantic zone of the property identified as a kitchen, instead of potentially retrieving a cup from a different semantic zone of the property.

The autonomous robot can also use the semantic mapping to improve its comprehension. For example, if located in a semantic zone of the property identified as a kitchen, then a language model used by the robot to perform speech recognition may be modified to favor terms that may be commonly heard in a kitchen environment over other words which may be less common in that environment. By performing language model biasing in this way, the autonomous robot is more likely to accurately respond to user commands. For example, if the autonomous robot's language model has been adjusted to favor terms heard more frequently in a kitchen setting due to the autonomous robot determining that it is located in a semantic zone that is labeled as a kitchen, the autonomous robot may respond to the command, "move the flour," by locating that item in its current semantic zone and moving it. Without such language biasing, the autonomous robot may use a language model that prefers the word "flower" over "flour," and so may incorrectly move the plant located in the semantic zone of the property labelled as a living room.

Knowledge of semantic zones within properties may provide other advantages to autonomous robots. For example, an autonomous robot may be configured not to enter semantic zones within a property that are identified as bedrooms during certain times of the day, to avoid the possibility of the autonomous robot disturbing someone who is sleeping in the bedroom during those times. Similarly, the autonomous robot may enter a "silent" mode while located in a semantic zone labelled as a bedroom, to avoid emitting sounds that could disturb people sleeping in the bedroom.

In other examples, knowledge of semantic zones can determine where an autonomous robot positions itself within a property, or may influence how the autonomous robot maneuvers through the property. For example, an autonomous robot may, by default, position itself in a semantic zone of the property identified as a living room when it is not performing other tasks, since users of the property are more likely to be located there and to request the assistance of the autonomous robot from that room. In another example, when the autonomous robot is determining a path from its current location to another location with the property, the autonomous robot may use the semantic mapping 135 of the property to select a path that utilizes a hallway instead of a path through multiple connected bedrooms and bathrooms, even if those other paths are shorter in distance. Other uses of a semantic mapping 135 of a property may become evident through the disclosure.

Figure 2:
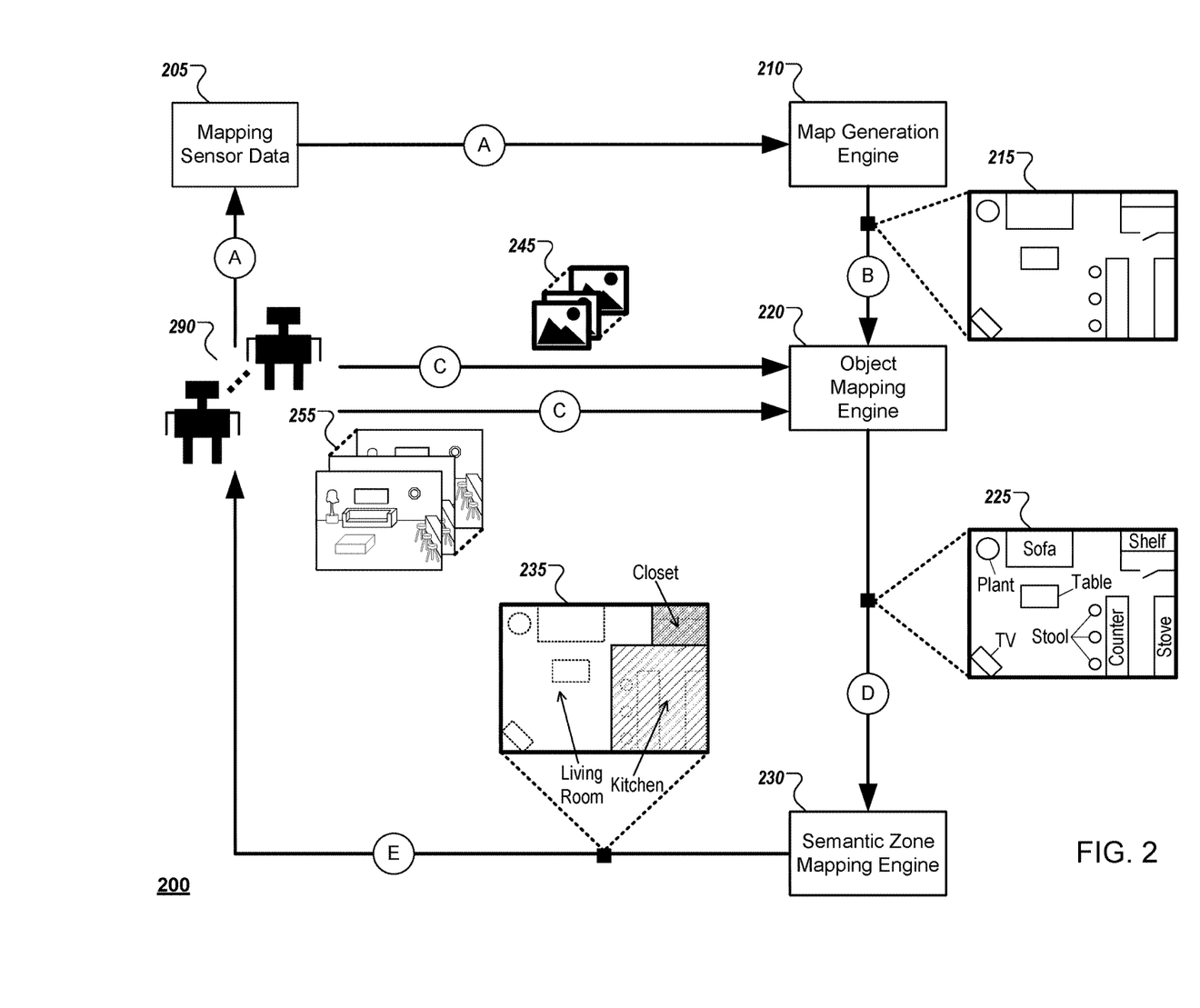

FIG. 2 depicts an example system 200 configured to generate a 3D mapping 215 of a property, and to generate a semantic mapping 235 of the property using the mapping 215. Briefly, the system 200 includes one or more autonomous robots 290 in communication with a map generation engine 210, an object mapping engine 220, and a semantic zone mapping engine 230. Each of the one or more autonomous robots 290, map generation engine 210, object mapping engine 220, and semantic zone mapping engine 230 may be in communication over one or more wired or wireless connections, for example, over one or more wired or wireless local area networks (LAN) or wide area networks (WAN).

In one implementations, the system 200 is configured to generate the 3D mapping based on mapping sensor data 205 received from the one or more autonomous robots 290. The object mapping engine 220 uses the mapping 215 and additional data from the one or more autonomous robots 290 corresponding to observations of the property to generate an object mapping 225 of the property, which the semantic zone mapping engine 230 can process to generate a semantic mapping 235.

At stage (A), the one or more autonomous robots 290 collect and transmit mapping sensor data 205 to the map generation engine 210. For example, the one or more autonomous robots 290 may be equipped with one or more sensors capable of the taking measurements of the property. For instance, the one or more autonomous robots 290 can be equipped with one or more stereo cameras, LIDAR, radar, sonar, or other forms of imaging or depth detection. An autonomous robot 290 can obtain measurements from the property, where each of the measurements is associated with information about the measurement. For example, each measurement may indicate a location from which the measurement was taken by the autonomous robot 290, such as coordinates, latitude and longitude, or other location information that indicates a position of the autonomous robot 290 within the property. The information may also indicate an orientation corresponding to the measurement, such as an indication of a direction from which the measurement was taken and an angle from which the measurement was taken. The measurements taken by the one or more autonomous robots 290 include a sufficient number of measurements to generate a 3D mapping of the property, or in some implementations, a portion of the property if a semantic mapping of only a portion of the property is desired.

The map generation engine 210 receives the mapping sensor data 205 from the one or more autonomous robots 205, and generates a mapping 215 of the property that is a 3D representation of the property. For example, the map generation engine 210 may receive the mapping sensor data 205 that includes the measurements and may use the measurements to determine where surfaces are located within the property. The surfaces may be represented using, for example, polygonal meshes, point clouds, point splatting, or any other form of 3D representation. In some implementations, the mapping 215 of the property may be a 3D representation of the property that represents space within the property, instead of surfaces. For example, the 3D representation may be comprised of a number of 3D cells that each represent a finite amount of volume within the property. The resolution of the three-dimensional representation may be determined as necessary for the particular application. For example, surfaces with more contours may be represented using a higher resolution, e.g., a small polygon size, than surfaces with fewer contours.

In some implementations, the mapping 215 of the property may be a static mapping 215 of the property, i.e., a mapping 215 that is initially determined by the map generation engine 210 and is not further updated. In other implementations, the mapping 215 of the property may be periodically updated, or may be updated based on the one or more autonomous robots 290 determining that the property has sufficiently changed. For example, if furniture within the property is moved, the one or more autonomous robots 290 may determine that the property has sufficiently changed to warrant re-mapping either all or a relevant portion of the property. The one or more autonomous robots 290 may therefore obtain new mapping sensor data 205 and provide that data to the map generation engine 210. The map generation engine 210 may update the mapping 215 of the property based on the new mapping sensor data 205, or may generate a new mapping 215 of the property based on the new mapping sensor data 205 or a combination of the new mapping sensor data 205 and the previously received mapping sensor data 205.

At stage (B), the map generation engine 210 provides the mapping 215 of the property to the object mapping engine 220. For example, upon the map generation engine 210 receiving the mapping sensor data 205 and processing the mapping sensor data 205 to generate a three-dimensional representation of the property, the map generation engine 210 can provide the three-dimensional representation of the property to the object mapping engine 220.

At stage (C), the one or more autonomous robots 290 also send additional information to the object mapping engine 220. In some implementations, the additional information can include images 245 or other observations of the property, such as point clouds, obtained by the one or more autonomous robots 290 from the property. In other implementations, the additional information can include additional sensor data 255 obtained by the one or more autonomous robots 290 from the property. The additional sensor data 255 can include, for example, additional LIDAR, radar, sonar, stereo camera images, or other imaging or depth sensing measurements. In some implementations, the mapping sensor data 205 may include all or a portion of the images 245 or the additional sensor data 255. In those implementations, the object mapping engine 220 may receive images or sensor data from the map generation engine 210 in place of, or in addition to, receiving images 245 or additional sensor data 255 from the one or more autonomous robots 290.

The received images 245 or additional sensor data 255 can be sufficient to identify objects throughout the property. For example, the images 245 may include images of each room of the property from a sufficient number of positions and perspectives to image the entire interior of each room. Similarly, the additional sensor data 245 may include measurements from each room of the property sufficient to determine the surfaces of the entirety of each room of the property.

The object mapping engine 220 receives and processes the mapping 215 of the property, the one or more images 245 and the additional sensor data 255 to generate an object mapping 225 of the property. The object mapping 225 is a 3D representation of the property in which portions of the 3D representation are identified as corresponding to particular objects, free space, or barriers. To generate the object mapping 225, the object mapping engine 220 identifies objects within the property based on the images 245 or the additional sensor data 255.

For example, as shown in FIG. 2, the object mapping engine 220 may receive the mapping 215 of the property from the map generation engine 210. Based on images 245 and additional sensor data 255 received from the one or more autonomous robots 290, the object mapping engine may identify a plant, a sofa, a television, three stools, a counter, a stove, a table, and a shelf. Based on the location and orientation from which the images 245 and other sensor data 255 were obtained, the object mapping engine may label portions of the mapping 215 as corresponding to the identified plant, sofa, television, stools, counter, stove, table, and shelf. The object mapping engine 220 may also label each of the identified objects in the object mapping 225 with locations indicating the position or boundaries of the objects within the property.

To perform object recognition, the object mapping engine 220 may include an object recognition engine that is capable of identifying objects based on images or other sensor data. For example, the object recognition engine may identify objects based on the geometry of objects identified in the images 245 or the additional sensor data 255. For example, the object recognition engine 220 may have access to one or more object templates or object features templates that specify features of objects or parts of objects. The object recognition engine 220 may compare features derived from the image data 225 or the other sensor data 235 to identify one or more objects depicted by the image data 225 or the other sensor data 235. In some examples, objects may be described by object constellation models in which objects are described by features that are geometrically related, e.g., a particular object is described by features that are positioned relative to one another. The object recognition engine 220 may identify an object based on identifying the features of a particular object and determining that the position of those features relative to one another satisfies the object constellation model.

The object recognition engine may consider other information in identifying objects. For example, the object recognition engine may consider the likely positioning of a particular object within a room, such that an object that resembles both a table and cabinet but that is attached to the ceiling will be identified as a cabinet, since it is unlikely that a table would be attached to the ceiling. The object recognition engine may also consider the proximity of other identified objects when identifying objects. For example, an object that could be identified as either a television or a microwave but that is positioned near an object identified as a refrigerator may be identified as a microwave, because it is more likely for a microwave to be near a refrigerator than a television. Other methods of object identification may also be implemented by the object recognition engine.

While described above as utilizing images 245 or additional sensor data 255 to perform object recognition, in other implementations, the object mapping engine 220 may identify objects based on the mapping 215 of the property. For example, where the mapping 215 of the property has sufficient resolution, the object recognition engine of the object mapping engine 220 may be capable of processing the mapping 215 of the property to identify objects.

Having identified the objects within the property, the object mapping engine 220 can then generate the object mapping 225 of the property. The object mapping engine 220 can generate an object mapping 225 by generating a new 3D representation of the property in which portions of the 3D representation are labelled as objects, barriers, or free space, or by applying labels to the mapping 215 of the property to identify portions of the mapping 215 as objects, barriers, or free space. For example, the object mapping engine 220 may label a plurality of individual cells of a polygonal mesh of the mapping 215 as representing a particular object, or may create groupings of cells of the polygonal mesh and label each grouping of cells as representing a particular object. Cells of the mesh that are not identified as corresponding to a particular object may be labelled as free space.

In other implementations, the object mapping engine 220 may generate a new 3D representation of the property and may label portions of the new 3D representation of the property as different objects. For example, the object mapping engine 220 may generate a new polygonal mesh of the property, and may label cells or groups of cells of the new polygonal mesh as objects or as free space. In another example, the object mapping engine 220 may generate a 3D representation of the property that represents space within the property using 3D cells that each represent a finite volume. In those implementations, the object mapping engine 220 may label individual 3D cells or groups of 3D cells as corresponding to a particular object.

Regardless of the type of mapping that is used for the object mapping 225, each of the cells or groups of cells within the object mapping 225 may also be labelled with a location of the object within the property. The label may indicate, for example, a center of the object within the property, may specify bounds of the object within the property, e.g., coordinates for the different corners of the object, or may otherwise indicate the location of the object within the property.

In some implementations, the object mapping engine 220 may include an artificial neural network, such as a deep convolutional neural network that is configured to identify objects from the images 245 or additional sensor data 225, or of identifying objects from the mapping 215 of the property. The artificial neural network may also be capable of mapping the identified objects to appropriate areas of the property to generate the object mapping 225.

In other implementations, the artificial neural network of the object mapping engine 220 may not itself generate the object mapping 225, but instead, may output information that is used to generate the object mapping 225. For example, the artificial neural network may output confidence scores indicating confidences that certain images 245 or additional sensor data 255 represents certain objects, or indicating that certain areas of the mapping 215 correspond to certain identified objects. The object mapping engine 220 may use the confidence scores to designate areas of the 3D representation of the property as corresponding to particular objects.

At stage (D), the object mapping engine 220 provides the object mapping 225 to the semantic zone mapping engine 230. The semantic zone mapping engine 230 receives and processes the object mapping 225 to generate a semantic mapping 235 of the property. The semantic mapping 235 of the property is a 3D representation of the property in which areas of the property are identified as different semantic zones. To generate the semantic mapping 235, the semantic zone mapping engine 230 identifies cubes of interest within the property, and identifies a semantic zone type for each of the cubes of interest.

The semantic zone mapping engine 230 may include a semantic mapping neural network that is an artificial neural network, such as a deep convolutional neural network, configured to process the object mapping 225. For example, a semantic mapping neural network of the semantic zone mapping engine 230 may receive the object mapping 225 as input. The semantic mapping neural network may process the object mapping 225 to identify groups of one or more related objects and cubes of interest that each contain a group of one or more related objects. The semantic mapping neural network may also determine a semantic zone type associated with each of the groups of one or more related objects. The semantic mapping neural network can then generate the semantic mapping 235 of the property by labelling the cubes of interest as particular semantic zones within the property, where each of the semantic zones may also be assigned a location indicating the location of the semantic zone or the bounds of the semantic zone.

In some implementations, the semantic mapping neural network of the semantic zone mapping engine 230 may not itself generate the semantic mapping 235, but instead, may output information that is used by the semantic zone mapping engine 230 to generate the semantic mapping 235. For example, the semantic mapping neural network may output confidence scores indicating confidences of cubes of interest and semantic zone types corresponding to those cubes of interest, or may output other information usable by the semantic zone mapping engine 230 to generate the semantic mapping 235. The semantic zone mapping engine 230 may use the confidence scores or other information to designate the semantic zones of the semantic mapping 235.

In some implementations, the semantic zone mapping engine 230 determines cubes of interest by identifying groups of objects that are determined to be related. For example, the semantic zone mapping engine 230 may determine that a sofa, television, table, and plant are each sufficiently related that they likely belong to the same cube of interest, and so may create a group of objects that includes these. A second group of objects may be determined that includes the stove and counter of the property, since these are objects that are sufficiently related, i.e., they often appear together as a part of a single semantic zone. The three stools depicted in the object mapping 235 may be objects that could belong to either the object group that includes the television and sofa, or to the object group that includes the stove and counter, and the semantic zone mapping engine 230 may determine, based on a likelihood of the stools belong to each group, to include the stools in the object group with the stove and counter.

Other information may be used to determine groups of objects. For example, the semantic zone mapping engine 230 may consider the presence and position of walls within the property. For example, because the shelf is isolated by walls or a door on all four sides, the semantic zone mapping engine 230 may determine that the shelf is unlikely to belong to either of the other two groups of objects, and so may be included in its own object group. In addition to the presence of barriers, such as walls, the semantic zone mapping engine 230 may also consider the proximity and relative locations of objects in the property. For example, were there two sofas identified within the property, but located far apart from one another or separated by barriers, the semantic zone mapping engine 230 may determine that the sofas are likely not in the same semantic zone and therefore should not be included in the same object group.

The semantic zone mapping engine 230 may determine semantic zone types associated with each of the object groups. For example, the semantic zone mapping engine 230 determine that the objects in a particular group are likely associated with a kitchen or a living room, depending upon the objects included in each group. In some implementations, each object may be associated with one or more scores indicating a likelihood of each object being located in each semantic zone type. For example, a television may have a score indicating a high likelihood of being in a living room, and another score indicating a low likelihood of being in a garage. Based on the scores for the objects in a particular group, the particular group may be identified as having a particular semantic zone type. For example, cumulative scores for the object group may be determined based on the scores for the individual objects in the group, and a semantic zone type assigned to the group based on the cumulative scores, e.g., by assigning the semantic zone type with the highest cumulative score to the object group.

In some implementations, the assignment of semantic zone types to object groups may consider the semantic zone types of other object groups within the property. For example, if the semantic zone mapping engine 230 identifies two object groups as dining rooms, but does not identify a kitchen object group, the semantic zone mapping engine 230 may reassign one of the object groups as a kitchen, since a property is unlikely to have two dining rooms and no kitchen.

The semantic zone mapping engine 230 determines cubes of interest that define the boundaries of each semantic zone. For example, given the object mapping 225 of the property, the semantic zone mapping engine 230 may determine regions within the object mapping 225 that each include all of the objects of an object grouping. The semantic zone mapping engine 230 may determine the cubes of interest such that boundaries between the different zones of interest align, i.e., such that none of the semantic zones overlap and such that no space within the property is not assigned to a semantic zone. For example, the semantic zone mapping engine 230 may determine the boundaries of each cube of interest to align with a boundary of another cube of interest.

To determine a cube of interest, the semantic zone mapping engine 230 may determine a space within the property that includes all objects of an object grouping. In some implementations, the semantic zone mapping engine 230 may do so by first locating a central coordinate of all of the objects of the grouping. For example, given the positions of the three stools, the counter, and the stove that belong to the kitchen object grouping, the semantic zone mapping engine 230 may determine that a point somewhere in the space between the counter and the stove is the center point of the positions of all of the objects in the kitchen object grouping. The semantic zone mapping engine 230 may then expand the cube of interest in each direction until the cube of interest includes all of the objects of the grouping, limited by its coming into contact with boundaries of other cubes of interest of the property.

While described herein as cubes of interest, in some implementations the semantic zone mapping engine 230 may determine areas of interest within a property that specify areas of a floorplan of the property as distinct areas of interest. For example, instead of generating 3D cubes of interest, the semantic zone mapping engine 230 may determine areas of the floorplan, similar to a flattening of the cubes of interest into two-dimensions, as corresponding to distinct zones of interest.

Having determined the cubes of interest of the property, the object groups, and the semantic zone types associated with the object groups, the semantic zone mapping engine 230 can generate the semantic mapping 235 of the property. Specifically, the semantic zone mapping engine 230 can generate a 3D representation of the property that specifies semantic zones within the property. The semantic mapping 235 may be similar to the mapping 215 or object mapping 225, which has been labelled with semantic zones corresponding to the different cubes of interest and their corresponding semantic zone types. Each of the semantic zones may also be associated with information indicating the dimensions or boundaries of the semantic zone.

As with the object mapping 225, the semantic zone mapping engine 230 may generate a new 3D representation of the property for the semantic mapping 235, or may label the mapping 215 or object mapping 225 with the semantic zone information. Thus, in some implementations, the semantic mapping 235 may indicate both the semantic zones and the objects within the property, while in other implementations, the semantic mapping 235 may indicate only the semantic zones of the property.

At stage (E), the semantic mapping 235 is provided to the one or more autonomous robots 290. The semantic mapping 235 may be stored at the one or more autonomous robots 290, or otherwise provided to the one or more autonomous robots 290 for use as discussed with respect to FIG. 1. Over time, the system 200 may update or generate a new semantic mapping 235 of the property and provide the updated or new semantic mapping 235 to the one or more autonomous robots 290.

Figure 3:
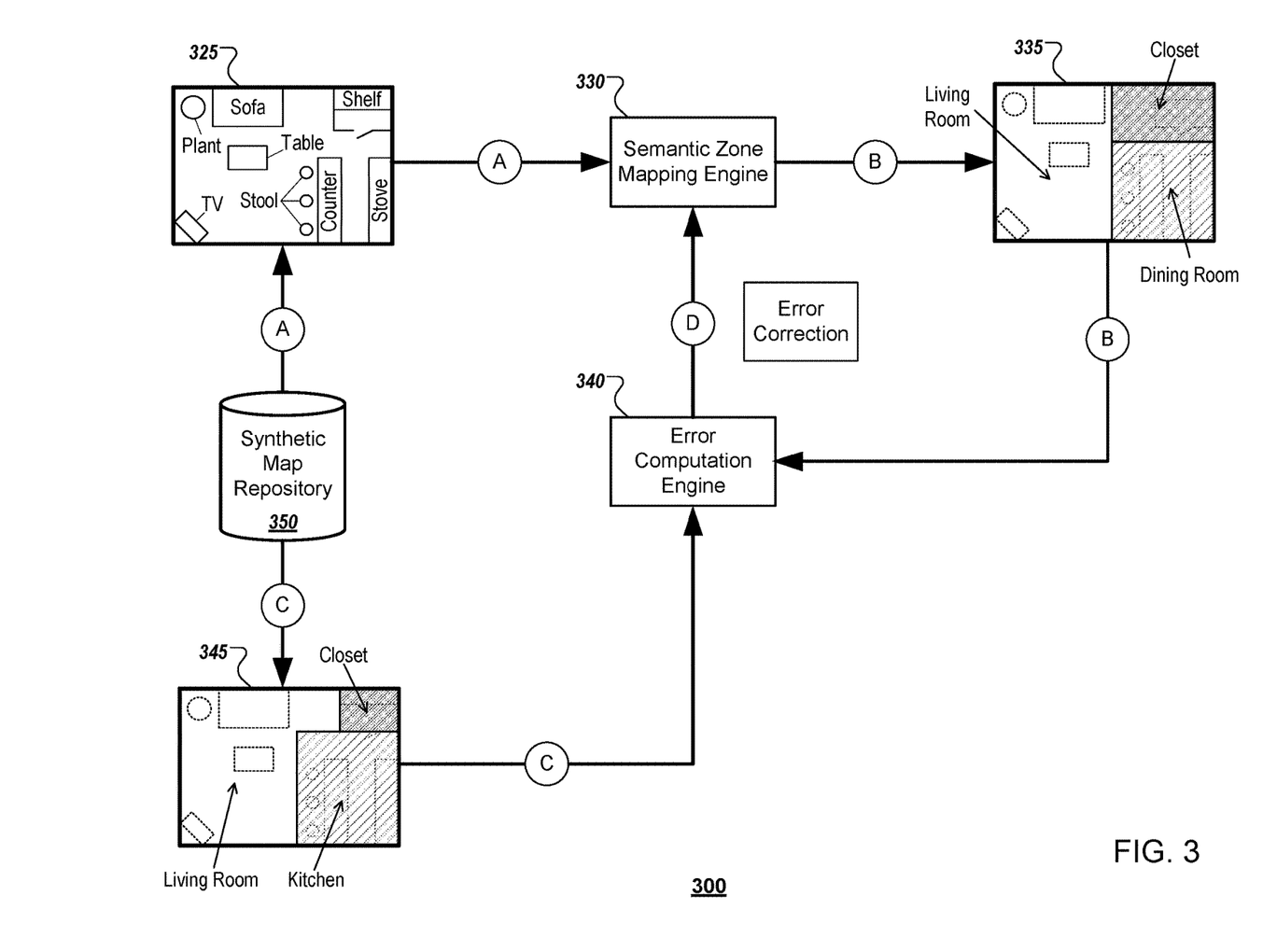
FIG. 3 depicts an example system for training a system to generate a semantic mapping of a property.

FIG. 3 depicts an example system 300 for training a system to generate a semantic mapping of a property. Specifically, the system 300 is configured to train a semantic zone mapping engine 330 to improve the accuracy of semantic maps generated by the semantic zone mapping engine 330 from object mappings. To do so, the system 300 utilizes synthetic pairs of object mappings and semantic mappings, where the term synthetic is used to distinguish these artificial or predetermined mappings from mappings generated by the semantic zone mapping engine 330. The system 300 trains the semantic zone mapping engine 330 by having the semantic zone mapping engine 330 generate an estimated semantic mapping based on a synthetic object mapping, and optimizing the semantic zone mapping engine 330 based on deviations between the estimated semantic mapping and a synthetic semantic mapping that corresponds to the synthetic object mapping.

In further detail, at stage (A) of the process shown in FIG. 3, a synthetic map repository 350 provides a synthetic object mapping 325 to the semantic zone mapping engine 330. The synthetic map repository 350 may be a database or other collection of synthetic mapping pairs, where each synthetic mapping pair includes a synthetic object mapping of a property and a corresponding synthetic semantic mapping of the property. The synthetic mapping pairs may be predetermined, i.e., generated before training of the semantic zone mapping engine 330, or may be otherwise artificially generated, i.e., generated by a computer during the training process.

The semantic zone mapping engine 330 receives the synthetic object mapping 325 and processes the synthetic object mapping 325 to generate an estimated semantic mapping 335 corresponding to the synthetic object mapping 325. Specifically, the semantic zone mapping engine 330 may be similar to the semantic zone mapping engine 230 of FIG. 2 and may include a semantic mapping neural network similar to that described for the semantic zone mapping engine 230. The semantic mapping neural network of the semantic zone mapping engine 330 may receive the synthetic object mapping 325, and may process the synthetic object mapping 325 using techniques similar to those disclosed with respect to FIGS. 1 and 2 to output an estimated semantic mapping 335 or data used to generate an estimated semantic mapping 335.

At stage (B), the semantic zone mapping engine 330 provides the estimated semantic mapping 335 to an error computation engine 340, and at stage (C), the synthetic map repository 350 provides a synthetic semantic mapping 345 corresponding to the synthetic object mapping 325 to the error computation engine 340. The error computation engine 340 receives the estimated semantic mapping 335 and the synthetic semantic mapping 345, and computes an error between the estimated semantic mapping 335 and the synthetic semantic mapping 345 that is used in training the semantic zone mapping engine 330.

For example, the error computation engine 340 may apply a loss function to the estimated semantic mapping 335 and the synthetic semantic mapping 345 to determine a loss caused by the semantic zone mapping engine 330 generating the estimated semantic mapping 335 from the synthetic object mapping 325. The loss may correspond to deviations between the semantic zones of the estimated semantic mapping 335 produced at stage (A) of the process, and the semantic zones of the synthetic semantic mapping 345 stored at the synthetic map repository 350. In some implementations, the loss function may represent the deviations as a loss in the accuracy of the determination and labelling of semantic zones in the estimated semantic mapping 335 as a result of the semantic zone mapping engine 330 estimating the semantic zone types and cubes of interest from the synthetic object mapping 325.

Having calculated the error, at stage (D), the error computation engine 340 uses the calculated error to further optimize the semantic zone mapping engine 330. For example, the computed loss between the estimated semantic mapping 335 and the synthetic semantic mapping 345 may be used to perform parameter optimization for layers of the semantic mapping neural network of the semantic zone mapping engine 330. Parameter optimization enables the semantic zone mapping engine 330 to more accurately determine the semantic zones of a property based on an object mapping, by optimizing the semantic mapping neural network. The training process depicted in FIG. 3 may be repeated for multiple pairs of synthetic object mappings and synthetic semantic mappings to iteratively optimize the semantic zone mapping engine 330. Over time and with sufficient training through iterations of the process shown in FIG. 3, the semantic zone mapping engine 330 may improve such that estimated semantic mappings of properties may converge to the synthetic semantic mappings of properties.

Figure 4:
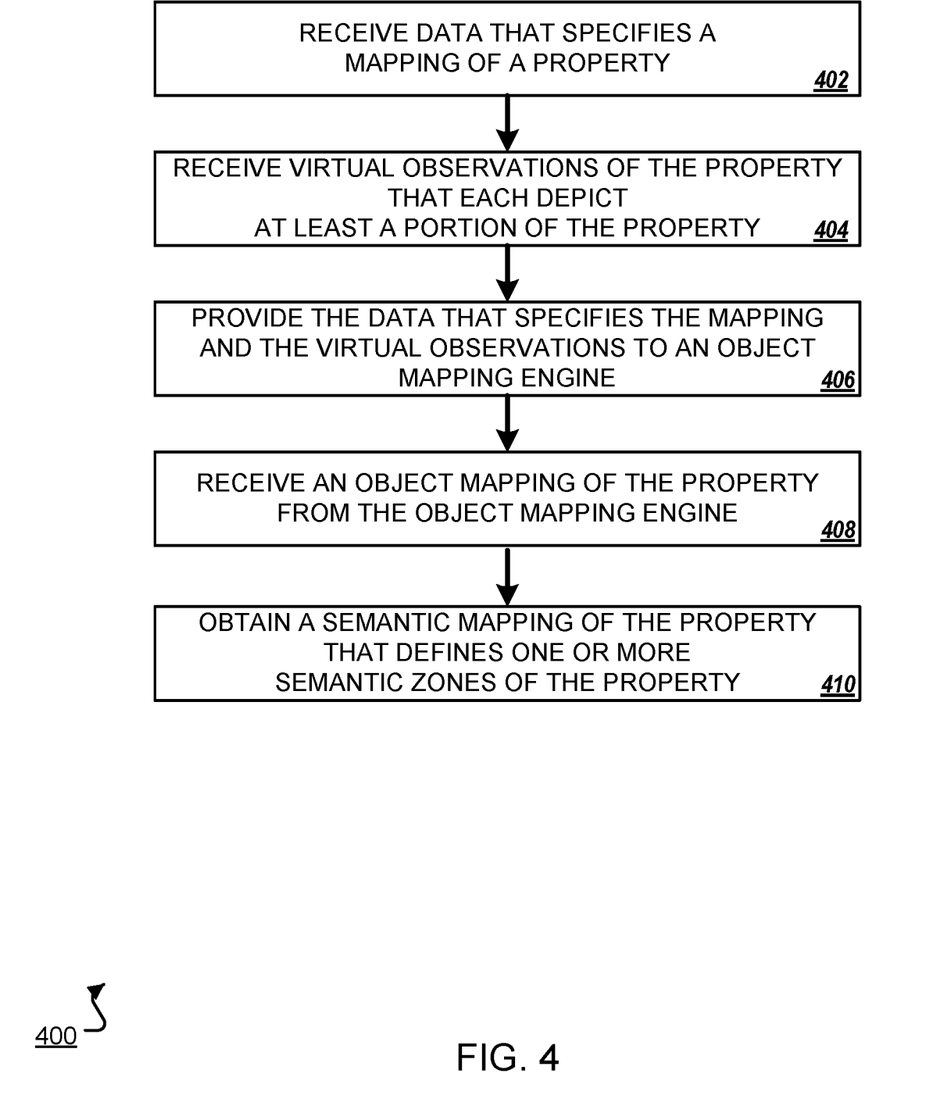
FIG. 4 is a flowchart of an example process for generating a semantic mapping of a property.

FIG. 4 is a flowchart of an example process for generating a semantic mapping of a property. In some implementations, the process 400 may be performed by the system 200 of FIG. 2, or by another system.

The system receives data that specifies a mapping of a property, wherein the mapping of the property includes a 3D representation of the property that was generated based on measurements taken at the property (402). For example, the object mapping engine 220 of FIG. 2 can receive the mapping 215 of the property. The received mapping 215 can be a 3D representation of the property that was generated based on measurements taken at the property by the one or more autonomous robots 290 that are included in the mapping sensor data 205. In other examples, the mapping 215 or the mapping sensor data 205 used by the map generation engine 210 to generate the mapping 215 can be received from outside of the system 200, e.g., from one or more users who submit the mapping 215 to the object mapping engine 220 or the mapping sensor data 205 to the map generation engine 210.

The system receives one or more images of the property, wherein each of the one or more images depicts at least a portion of the property that is represented in the mapping of the property (404). For example, the object mapping engine 220 of the system 200 can receive images 245 from the autonomous robots 290, where the images 245 depict portions of the property that is represented in the mapping 215 of the property. In some implementations, in addition to or in place of the images 245, the object mapping engine 220 may also receive additional sensor data 255, such as LIDAR or other image or depth measurement data, that depicts portions of the property represented by the mapping 215. In other examples, the images 245 or additional sensor data 255 may be received externally from the system 200, for example, from one or more users of the property.

The system provides the data that specifies the mapping of the property and the one or more images of the property to an object mapping engine (406). For example, the object mapping engine 220 can receive the mapping 215 from the map generation engine 210 and can receive the images 245 from the autonomous robots 290. In other examples, the object mapping engine 220 can receive the mapping 215 and the images 245 from another component of the system 200, or can receive the mapping 215 and the images 245 from outside of the system 200, e.g., from a user of the property.

The system receives, from the object mapping engine, an object mapping of the property (408). The object mapping of the property includes a plurality of object labels that each identify a respective object that was recognized from at least one of the one or more images of the property, and a location of the respective object within the 3D representation of the property that corresponds to a physical location of the particular object in the property. For example, the object mapping engine 220 may process the mapping 215 of the property and the images 245 that depict portions of the property to generate an object mapping 225 of the property. The object mapping 225 of the property includes a plurality of labels. Each of the labels may identify an object that was depicted and recognized from at least one of the images 245, such as a plant, television, stool, or other object depicted in the mapping 225. Additionally, each of the labels may indicate a location of the object within the mapping 225, wherein the location within the mapping 225 corresponds to a physical location of the object in the property. For example, the object label for the television may specify coordinates, a latitude and longitude, information defining boundaries, or other information indicating the location of the television within the object mapping 225, wherein that location corresponds to a physical location of the television within the property.

The system obtains a semantic mapping of the property that defines one or more semantic zones of the property with respect to the 3D representation of the property (412). The semantic mapping is generated based on an output that results from a semantic mapping model processing the object mapping of the property. For example, the object mapping engine 220 may transmit the object mapping 225 of the property to the semantic mapping engine 230 of the system 200. The semantic mapping engine 230 can include a semantic mapping neural network, i.e., an artificial neural network, that can receive the object mapping 225 and process the object mapping 225 to generate an output.

The semantic zone mapping engine 230 can use the output of the semantic mapping neural network to generate a semantic mapping 235 of the property that defines one or more semantic zones of the property with respect to the mapping 215 or the object mapping 225 of the property. For example, an output of the semantic mapping neural network of the semantic zone mapping engine 230 can be the semantic mapping 235, or can be confidence scores or other types of data that the semantic zone mapping engine 230 can use to generate the semantic mapping 235 of the property. The semantic mapping 235 can be output, for example, to the one or more autonomous robots 290.

A number of implementations have been described. Nevertheless, it will be understood that various modifications may be made without departing from the spirit and scope of the disclosure. For example, various forms of the flows shown above may be used, with stages re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

While the foregoing embodiments have been predominantly described with reference to the development or processing of speech inputs for use with applications installed on user devices, the described features may also be used with respect to machines, other devices, robots, or other systems. For example, the described systems and methods may be used to improve user interactions with machinery, where the machinery has an associated computing system, may be used to develop and implement voice actions for interacting with a robot or system having robotic components, may be used to develop and implement voice actions for interacting with appliances, entertainment systems, or other devices, or may be used to develop and implement voice actions for interacting with a vehicle or other transportation system.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
   receiving a first set of data that represents a three-dimensional (3D) mapping of a property, the 3D mapping encompassing a plurality of physical zones of the property;
   receiving a second set of data that represents an observation of the property separate from the 3D mapping, the observation including representations of a plurality of objects at the property observed by a sensing system;

processing the first set of data and the second set of data to generate an object mapping of the property that provides a plurality of object labels, each object label identifying:
- (i) a respective object of the plurality of objects that was recognized from the observation of the property, and
- (ii) a location of the respective object within the 3D mapping of the property; and generating a semantic mapping of the property that provides semantic labels for the plurality of physical zones of the property, the semantic label for each particular physical zone identifying a type of space defined by the particular physical zone within the property, wherein determining a first semantic label for a first physical zone of the property includes:
- (i) processing information indicated by the object mapping of the property about objects located in the first physical zone, and
- (ii) classifying the first physical zone as a first type of space rather than a second type of space based on a number of physical zones in the property classified as the second type of space, wherein the first physical zone is a first room of the property.

2. The computer-implemented method of claim 1, wherein the 3D mapping of the property comprises a 3D mesh representation of the property, a point cloud representation of the property, or a point splatting representation of the property.

3. The computer-implemented method of claim 1, wherein the second set of data represents a plurality of observations of the property, wherein at least two of the plurality of observations were made at different locations of the property or with different perspectives from each other.

4. The computer-implemented method of claim 1, further comprising:
receiving a plurality of range detection measurements obtained from the property;
providing the plurality of range detection measurements obtained from the property to an object mapping engine; and
receiving, from the object mapping engine, the object mapping of the property, wherein the object mapping of the property is generated further based on the plurality of range detection measurements.

5. The computer-implemented method of claim 1, further comprising performing geometry-based object classification using the observation of the property to generate the object mapping of the property.

6. The computer-implemented method of claim 1, wherein the object mapping of the property comprises a labelled 3D mesh representation of the property, and wherein each cell of the labelled 3D mesh representation of the property is labelled (i) as an object that was recognized from the observation of the property, or (ii) as free space.

7. The computer-implemented method of claim 6, wherein each object label of the plurality of object labels is associated with a respective plurality of the cells of the labelled 3D mesh representation of the property that correspond to a respective object that was recognized from the observation of the property.

8. The computer-implemented method of claim 7, wherein generating the semantic mapping further comprises:
identifying a set of related object labels from among the plurality of object labels, wherein each of the set of related object labels identifies an object of a set of related objects that were recognized from the observation of the property or from one or more other observations of the property;
selecting a set of cells from among the cells of the labelled 3D mesh representation of the property, the selected set of cells comprising the pluralities of cells associated with each of the related object labels;
determining a cube of interest that encompasses the selected set of cells of the labelled 3D mesh representation of the property; and
identifying, as the first physical zone of the property, the cube of interest that encompasses the set of cells of the labelled 3D mesh representation of the property.

9. The computer-implemented method of claim 1, comprising:
providing a synthetic object mapping of a synthetic property to a semantic mapping model;
obtaining an estimated semantic mapping of the synthetic property that defines one or more semantic zones of the synthetic property, wherein the estimated semantic mapping is generated based on an output that results from the semantic mapping model processing the synthetic object mapping of the synthetic property;
providing the estimated semantic mapping and a synthetic semantic mapping of the synthetic property corresponding to the synthetic object mapping of the synthetic property to an error computation engine;
obtaining, from the error computation engine, an error that is determined based at least on deviations between the estimated semantic mapping and the synthetic semantic mapping of the synthetic property; and
training the semantic mapping model based at least on the error.

10. The computer-implemented method of claim 1, wherein the plurality of physical zones of the property are non-overlapping.

11. The computer-implemented method of claim 1, comprising:
transmitting the semantic mapping of the property to one or more autonomous robots.

12. The computer-implemented method of claim 1, wherein the first set of data and the second set of data are received from one or more autonomous robots.

13. The computer-implemented method of claim 1, wherein the observation of the property comprises one or more images of the property that each depict at least a portion of the property or one or more point clouds that each depict at least a portion of the property that is represented in the 3D mapping of the property.

14. A system comprising:
one or more processors configured to execute computer program instructions; and
one or more computer-storage media encoded with computer programs that, when executed by the one or more processors, cause the system to perform operations comprising:
receiving a first set of data that represents a three-dimensional (3D) mapping of a property, the 3D mapping encompassing a plurality of physical zones of the property;
receiving a second set of data that represents an observation of the property separate from the 3D mapping, the observation including representations of a plurality of objects at the property observed by a sensing system;

processing the first set of data and the second set of data to generate an object mapping of the property that provides a plurality of object labels, each object label identifying:
  (i) a respective object of the plurality of objects that was recognized from the observation of the property, and
  (ii) a location of the respective object within the 3D mapping of the property; and
generating a semantic mapping of the property that provides semantic labels for the plurality of physical zones of the property, the semantic label for each particular physical zone identifying a type of space defined by the particular physical zone within the property, wherein determining a first semantic label for a first physical zone of the property includes:
  (i) processing information indicated by the object mapping of the property about objects located in the first physical zone, and
  (ii) classifying the first physical zone as a first type of space rather than a second type of space based on a number of physical zones in the property classified as the second type of space, wherein the first physical zone is a first room of the property.

15. The system of claim 14, wherein the object mapping of the property comprises a labelled 3D mesh representation of the property, and wherein each cell of the labelled 3D mesh representation of the property is labelled (i) as an object that was recognized from the observation of the property, or (ii) as free space.

16. The system of claim 15, wherein each object label of the plurality of object labels is associated with a respective plurality of the cells of the labelled 3D mesh representation of the property that correspond to a respective object that was recognized from the observation of the property.

17. The system of claim 13, wherein the operations comprise:
providing a synthetic object mapping of a synthetic property to a semantic mapping model;
obtaining an estimated semantic mapping of the synthetic property that defines one or more semantic zones of the synthetic property, wherein the estimated semantic mapping is generated based on an output that results from the semantic mapping model processing the synthetic object mapping of the synthetic property;
providing the estimated semantic mapping and a synthetic semantic mapping of the synthetic property corresponding to the synthetic object mapping of the synthetic property to an error computation engine;
obtaining, from the error computation engine, an error that is determined based at least on deviations between the estimated semantic mapping and the synthetic semantic mapping of the synthetic property; and
training the semantic mapping model based at least on the error.

18. One or more computer-readable devices storing software comprising instructions executable by one or more computers which, upon such execution, cause the one or more computers to perform operations comprising:
receiving a first set of data that represents a three-dimensional (3D) mapping of a property; receiving a first set of data that represents a three-dimensional (3D) mapping of a property, the 3D mapping encompassing a plurality of physical zones of the property;
receiving a second set of data that represents an observation of the property separate from the 3D mapping, the observation including representations of a plurality of objects at the property observed by a sensing system;
processing the first set of data and the second set of data to generate an object mapping of the property that provides a plurality of object labels, each object label identifying:
  (i) a respective object of the plurality of objects that was recognized from the observation of the property, and
  (ii) a location of the respective object within the 3D mapping of the property; and
generating a semantic mapping of the property that provides semantic labels for the plurality of physical zones of the property, the semantic label for each particular physical zone identifying a type of space defined by the particular physical zone within the property, wherein determining a first semantic label for a first physical zone of the property includes:
  (i) processing information indicated by the object mapping of the property about objects located in the first physical zone, and
  (ii) classifying the first physical zone as a first type of space rather than a second type of space based on a number of physical zones in the property classified as the second type of space, wherein the first physical zone is a first room of the property.

19. The computer-implemented method of claim 1, wherein classifying the first physical zone as the first type of space rather than the second type of space comprises identifying classifications for groups of objects in the first physical zone and a second physical zone separate from the first physical zone.

20. The computer-implemented method of claim 1, comprising classifying the first physical zone as the first type of space rather than the second type of space if a total number of physical zones of the property classified as the second type of space exceeds a maximum number of physical zones for the second type of space in the property.

* * * * *